United States Patent [19]

Bruya

[11] Patent Number: 4,841,998

[45] Date of Patent: Jun. 27, 1989

[54] SOIL DECONTAMINATION METHOD

[76] Inventor: James E. Bruya, 4201 35th Ave. W., Seattle, Wash. 98199

[21] Appl. No.: 113,628

[22] Filed: Oct. 26, 1987

[51] Int. Cl.$^4$ .............................................. B08B 3/08
[52] U.S. Cl. ..................................... 134/10; 134/25.1; 134/26; 585/861; 210/908; 210/909
[58] Field of Search ..................... 134/10, 25.1, 26; 210/909, 908; 585/861

[56] References Cited

U.S. PATENT DOCUMENTS

| | | | |
|---|---|---|---|
| 4,392,892 | 7/1983 | Wagner et al. | 134/25.1 |
| 4,405,448 | 9/1983 | Googin et al. | 210/909 |
| 4,424,081 | 1/1984 | Giguere | 134/10 |
| 4,507,155 | 3/1985 | Cheek | 134/6 |
| 4,574,013 | 3/1986 | Peterson | 134/2 |
| 4,662,948 | 5/1987 | Weitzman | 134/25.1 |
| 4,698,148 | 10/1987 | Keane | 134/10 |
| 4,699,667 | 10/1987 | Walsh | 210/909 |
| 4,726,905 | 2/1988 | Friedman et al. | 210/909 |

FOREIGN PATENT DOCUMENTS

| | | | |
|---|---|---|---|
| 2427088 | 6/1973 | Fed. Rep. of Germany | 210/909 |
| 4741568 | 2/1968 | Japan | 210/909 |

OTHER PUBLICATIONS

"Biodegradation of Hazardous Organic Pollutants", Emission & Effluent Control.

Robert Scholz, et al., "Mobile System for Extracting Spilled Hazardous Materials from Excavated Soils", Section 1, pp. 1-9, Municipal Environmental Research Laboratory.

Primary Examiner—Asok Pal
Attorney, Agent, or Firm—Christensen, O'Connor, Johnson & Kindness

[57] ABSTRACT

A method of decontaminating soil consisting of removing organic hazardous waste from contaminated soil with an aqueous ammonia solution. The resulting aqueous ammonia solution containing organic hazardous waste is further processed to isolate the organic hazardous waste in a small volume for disposal. Soil so treated can be returned to excavation site without further processing.

27 Claims, 3 Drawing Sheets

SOIL DECONTAMINATION METHOD

BACKGROUND OF THE INVENTION

1. Field of the Invention

The present invention broadly pertains to a method of decontaminating soil by extracting the soil with a liquid solvent. More particularly, this invention consists of a method of decontaminating soil which has been contaminated with an organic hazardous waste, comprising contacting the soil with an aqueous ammonia solution to extract the organic hazardous waste from the soil.

2. Description of the Prior Art

Various methods have been employed to remove contaminants from soil. Wagner et al. (U.S. Pat. No. 4,392,892) discloses a method whereby soil, sand or residues that contain oil or petroleum hydrocarbons are impregnated with an aqueous solution containing microbially-produced glycolipids. The resulting oil phase or emulsion leaves the capillaries of the oil containing material, rises out of the aqueous phase, and is thereafter separated.

Giguere (U.S. Pat. No. 4,424,081) discloses a method for reconditioning soils contaminated with heavy crude, refined petroleum, and/or chemicall products derived from similar sources. The method involves mixing the soils with water, sodium hydroxide and steam to provide a blended slurry. The blended slurry is further agitated and heated in a sparger kiln to approximately 210° F. at the kiln outlet to provide a fine particle slurry. A caustic liquid is also injected at the kiln inlet to facilitate extraction of the contaminants from the slurry. Separation of oil particles from the fine particle slurry is accomplished by first washing the slurry in a clarifier, followed by a second washing in flotation cell units, and finally subjecting the slurry to an aeration clarifier. A fatty acid or alcohol reagent is added at the aeration stage which produces a foam to which the oil particles adhere.

Paterson (U.S. Pat. No. 4,574,013) discloses a method for decontaminating soil containing halogenated contaminants by reaction schemes that are carried out in a slurry of soil and a nonaqueous reagent mixture. Peterson's nonaqueous reagent mixture contains an alkaline component and a sulfoxide catalyst. There are four possibilities suggested for the alkaline component: an alkali metal hydroxide, an alkali metal hydroxide/alcohol mixture, an alkali metal hydroxide/glycol mixture, or an alkoxide. The Peterson process employs a nonaqueous reagent mixture, and therefore when wet soil is to be decontaminated, a vacuum is first applied to remove any water prior to contacting the soil with the nonaqueous reagent mixture.

Weitzman (U.S. Pat. No. 4,662,948) discloses a method for removing polychlorinated biphenyls (PCB) and chlorinated dioxins from solids (particularly soil). In the Weitzman method, the contaminants are removed by contacting the solids with a nonaqueous liquid containing a halogenated hydrocarbon. Preferably, a smaller amount or polar organic solvent (normally methanol) is also used. The polar organic solvent apparently improves the wettability of the contaminated solids thus allowing the halogenated hydrocarbon to more easily extract PCB and dioxins.

In a study published by the U.D. Department of Commerce (National Technical Information Service #PB84-123637), funded by the United States Environmental Protection Agency and conducted by Rexnord, Inc., the requirements necessary for mobile systems for extracting spilled hazardous materials from excavated soils were analyzed. One result of the study was a listing of the characteristics necessary for an effective extraction fluid. Chief among these characteristics was a solvent possessing low volatility under ambient conditions.

Aqueous ammonia, a volatile solvent under ambient conditions would not be considered a suitable extraction fluid according to the above study and therefore, has not been used to decontaminate soil. However, aqueous ammonia has been used as a solvent for cleaning mechanical devices. For example, Cheek (U.S. Pat. No. 4,507,155) discloses a cleaning composition that includes a chlorinated hydrocarbon liquid, a petroleum distillate, an aliphatic alcohol, and aqueous ammonia. The composition consists of two phases, which must be shaken before application. The ammonia concentration of the composition is kept low (20–33% maximum) to prevent burns to the handler. The composition is disclosed as being suited fior removing dried printing ink from printing equipment such as printing rollers. The compositions also is reportedly useful as a spot remover for removing various stains from textile articles.

A need exists for relatively inexpensive methods for decontaminating large volumes of contaminated soil, found for example around hazardous waste dump sites, that would remove virtually all types of hazardous-wastes, both organic and inorganic. Furthermore, as the volume f these hazardous wastes at dump sites accumulates, and as our understanding of the long-term health effects of these wastes increases, the need for such methods will undoubtedly increase.

Unfortunately, there are very few methods currently available that are suitable to decontaminate large quantities if contaminated soil. The few methods that are available are quite costly and are applicable to only a narrow spectrum of contaminants. Further, these methods either leave as their end-product small amounts of contaminants dissolved in large volumes of extracting solution or leave transformed chemicals in the soil which can continue to threaten our environment, even thiugh not currently recognized. These methods provide little help in dealing with the disposal of the large amounts of wastes found at hazardous waste dump sites.

The present invention provides an easy-to-use method for decontaminating large volumes of soil containing hazardous organic waste utilizing readily available equipment, and widely available and inexpensive materials. It is applicable to a broad spectrum of contaminants and, unlike prior art methods, leaves a relatively small volume of waste residue.

SUMMARY OF THE INVENTION

A method for decontaminating soil comprising separating an aqueous ammonia solution containing an organic hazardous waste from a soil after contacting the soil contaminated with the organic hazardous waste with an aqueous ammonia solution. The method for decontaminating soil consists of forming an aqueous ammonia solution effective for removing organic hazardous waste from contaminated soil, contacting the soil contaminated with organic hazardous waste with an aqueous ammonia solution thereby transferring the organic hazardous waste from the soil to the aqueous ammonia solution and thereafter separating the aqueous ammonia solution containing the organic hazardous waste from the soil. Essentially all types of organic hazardous waste may be extracted from the soil by the method of this invention, however, the method is best employed in removing nonpolar organic hazardous wastes from soil. These include polynuclear aeromatic hydrocarbons, phthalate esters, mononuclear aryl, dinuclear aryl, substituted mononuclear aryl, polychlorinated biphenyl, chlorinated benzenes, chlorinated naphthalenes, chlorinated phenols, halogenated phenyl esters, alkyl chlorinated hydrocarbons, and petroleum products. In this method, the aqueous ammonia solution ranges from about 0.1 to about 10% ammonia by weight. The aqueous ammonia solution usually contains an organic promoter of effective concentration to enhance removal of the organic hazardous waste from the soil. The organic promoter is selected from the group consisting of unsaturated hydrocarbons and chlorinated hydrocarbons. Preferably organic promoters include pentane, hexane, heptane, octane, mineral oil, fuel oil Freon 113, 1,1,1-trichloroethane, and mixtures thereof, while the most preferred organic promoter is hexane.

The contacting step of the present invention consists of forming a slurry of the soil and the aqueous ammonia solution, wherein the soil, prior to mixing, has a particle sizes of less than about 3 inches in diameter. The contacting step consists of incubating the slurry of soil and the aqueous ammonia solution for from about 1 to about 10 minutes. During this time the slurry is agitated thereby more thoroughly transferring organic hazardous waste from the soil to the aqueous ammonia solution.

The separating step consists essentially of settling the soil from the aqueous ammonia solution and thereafter removing the aqueous ammonia solution. Optionally, fine soil particles are removed from the aqueous ammonia solution by centrifugation.

After separating the soil from the aqueous ammonia solution, the organic hazardous waste is isolated from the aqueous ammonia solution. The isolating step consists of extracting the aqueous ammonia solution containing the organic hazardous waste with an organic extracting solvent, thereby transferring organic hazardous waste to the organic extracting solvent. The organic extracting solvent, containing organic hazardous waste, is then distilled, thereby removing the organic extracting solvent from the organic hazardous waste. The distilled organic extracting solvent is collected and reused in subsequent extracting steps. The organic extracting solvent is selected from the group pentane, hexane, heptane, octane, Freon 113, 1,1,1-trichloroethane, and mixtures thereof, however, the preferred organic extracting solvent is hexane. The aqueous ammonia solution after having organic hazardous waste extracted can be collected and reused in decontamination of additional soil. In one embodiment of the present invention, the isolating step consists of volatilizing the ammonia from the aqueous ammonia solution thereby forming an organic phase consisting essentially of organic hazardous waste and an aqueous phase, and thereafter removing the organic phase. The volatilizing step consist of heating the aqueous ammonia solution to an effective temperature for an effective duration sufficient to remove essentially all of the ammonia in the aqueous ammonia solution. Optionally, the volatilized ammonia is condensed and remixed with fresh feed water thereby forming an aqueous ammonia solution suitable for reuse in treating contaminated soil.

In an alternative embodiment, the isolating step consists of volatilizing ammonia from the aqueous ammonia solution thereby forming an organic phase and an aqueous phase. Both the organic phase and the aqueous phase are thereafter extracted with an organic extracting solvent. The organic extracting solvent containing organic hazardous waste can be discarded without further processing or can be distilled thereby separating the organic hazardous waste from the organic extracting solvent. The organic hazardous waste is thereafter disposed of. When the organic extracting solvent is to be disposed of it is selected from the group consisting of diesel oil, petroleum ether, gasoline, mineral oil, fuel oil and mixtures thereof.

The method of this invention may include a plurality of contacting and steps in sequential order.

DETAILED DESCRIPTION OF THE INVENTION

Figure 1:
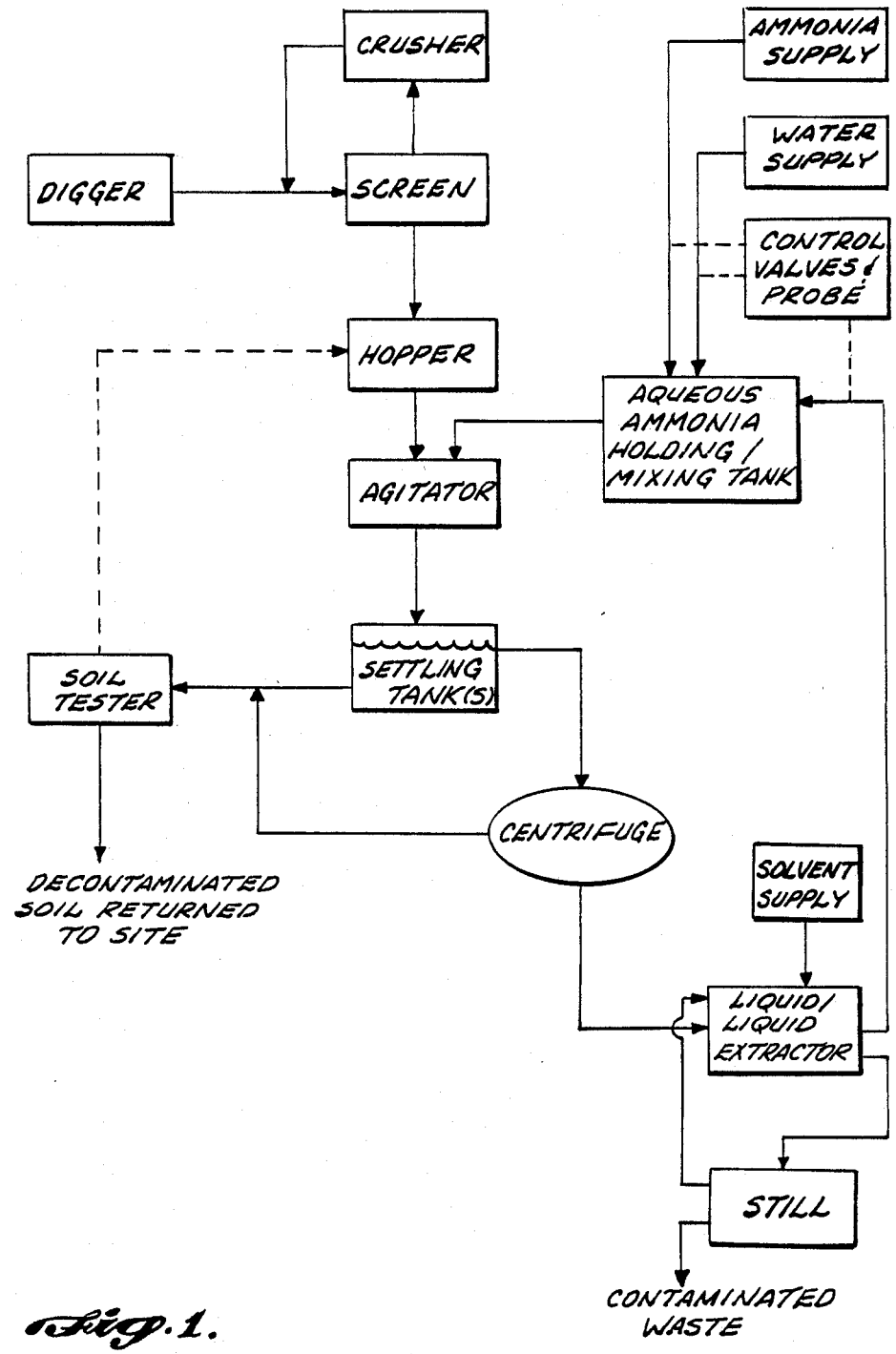
FIG. 1 is a block diagram representing the soil decontamination method employing a liquid/liquid extractor and still.

This invention is a method for decontaminating soil. The method is useful for decontaminating soil of virtually any type, but is particularly useful for decontaminating soil found in and around toxic waste dumps, or sites of large-scale soil contamination. This method is also suitable for the decontamination of semi-porous material such as concrejte. However, materials of this type must be ground before processing. While this method is applicable to decontamination of any of the standard soil types, clay has proven somewhat troublesome in clogging the process equipment involved. Wood and other organic materials are poorly suited for this method due to their tendency to float on the aqueous ammonia solution.

In its simplest form, this invention is a method fior decontaminating soil which consists of contacting soil, which has been contaminated with an organic hazardous waste, with an aqueous ammonia solution, and thereafter separating the aqueous ammonia solution containing the organic hazardous waste from the soil. The decontaminated soil can usually be returned to the excavation site without further treatment since residual ammonia will behave as a fertilizer. In some cases, residual ammonia may have to be partially removed. This can be easily achieved by washing the soil with fresh water or by volatilizing the residual ammonia by application of heat.

The method of decontaminating soil is suitable for use with all types of organic hazardous wastes. The method is particularly well suited for removing those nonpolar organic hazardous wastes found around hazardous waste disposal sites. By organic hazardous waste, as used herein, is meant those organic compounds which are hazardous wastes as defined in 40 CFR Part 261. By nonpolar, as used herein, is meant those compounds, which in aqueous solution exhibit a polarity less than water, and which are not charged at neutral pH. Examples of organic hazardous wastes suitable for use in accordance with the present invention include, but are not limited to, those organic compounds listed in 40 CFR Part 261, Subpart D, herein incorporated by reference. One of ordinary skill in reading the description of this invention will be able to determine which of those compounds listed in 40 CFR Part 261, Subpart D are nonpolar organic hazardous waste compounds and therefore most preferred. These nonpolar compounds include, by way of illustration: polynuclear aromatic hydrocarbons (PNA), for example benzo[a]anthracene, benzo[a]pyrene, benzo[b]fluoranthene, benzo[k]fluoranthene, chrysene, acenaphthylene, anthracene, benzo[ghi]perylene, fluorene, phenanthrene, dibenzo[a,h-]anthracene, indeno[1,2,3-cd]pyrene, and pyrene; phthalate esters, for example bis(2-ethylhexyl)phthalate, butyl benzyl phthalate, di-n-butyl phthalate, di-n-octyl phthlate, diethyl phthalate, and dimethyl phthalate; mononuclear aryls; for example benzene; substituted mononuclear aryls; for example n-pentyl benzene, and 2,6-dinitrotoluene; dinuclear aryls; for example naphthalene; polychlorinated biphenyls, for example PCB-1242, PCB-1254, PCB-1221, PCB-1232, PCB-1248, PCB-1260, and PCB-1016; chlorinated benzenes, for example chlorobenzene, 1,2,4-trichlorobenzene, and hexachlorobenzene; chlorinated naphthalenes, for example 2-chloronaphthalene; chlorinated phenols, for example 2,4,6-trichlorophenol, para-chloro-meta-cresol, 2-chlorophenol, pentachlorophenol, and 2,4j-dichlorophenol; halogenated phenyl ethers, for example 4-chlorophenol phenyl ether, and 4-bromophenyl phenyl ether; alkyl and alkyl substituted chlorinated hydrocarbons, for example aldrin, dieldrin, chlordane, DDT, 4,4'-DDT, 4,4'-DDE, 4,4'-DDD, alpha-endosulfan, beta-endosulfan, endosulfan sulfate, endrin, endrin aldehyde, heptachlor, heptachlor epoxide, hexachloroethane, bis(chloromethyl)ether, bis(2-chloroethyl)ether, 2-chloroethyl vinyl ether, 2,3,7,8-tetrachlorodibenzo-p-dioxin, 3,3-dichlorobenzidine, and toxaphene; and petroleum products, for example oil, grease, gasoline, turbine fuel, hydraulic fluid, and fuel oils. Preferred organic hazardous wastes suitable for use in accordance with this invention are listed in Appendix VIII of 40 CFR Part 261. Most preferred organic hazardous wastes include those nonpolar compounds listed in Appendix VIII of 40 CFR Part 261.

The method of this invention is best understood by referring to FIG. 1. The method consists of digging up contaminated soil by any conventional digger means. A preferred way of digging up the soil is with the use of equipment such as a backhoe or front-end loader. Equipment of this type is preferred because it is readily available and inexpensive. It is preferable to locate the process equipment near the contaminated soil in order to prevent spreading of the organic hazardous waste. Transporting the contaminated material any appreciable distance increases the possibility of spillage, and further uncontrolled release of the hazardous material.

After the soil has been removed from the contaminated site and transported to the location of the decontaminating process equipment, the contaminated soil is screened with a screening device. The screening device is designed to allow soil particles of about 3 inches in diameter or less to pass into a soil-holding such as a hopper. Those soil particles greater than 3 inches in diameter are treated separately, or are sent to a crusher, where they are ground and rescreened.

Next, an aqueous ammonia solution is formed. This may be accomplished by mixing liquid ammonia with water. The preferred concentration of the aqueous ammonia solution is from about 0.1% to about 10% ammonia by weight. A steady source of aqueous ammonia solution is best accomplished through the use of an aqueous ammonia holdin tank. The tank may also contain mixing apparatus in order to maintain a constant concentration throughout the tank. Additionally, control valves on the ammonia and water supply, as well as use of an ammonia probe monitor, can be used to maintain a constant concentration of aqueous ammonia in the tank.

In an alternative embodiment, the aqueous ammonia solution may be formed in the presence of the soil. This is accomplished by simply mixing liquid ammonia, water, and soil in any order, with the proviso that the final concentration of ammonia in aqueous solution be within the preferred concentration limits.

A preferred embodiment of this invention includes the addition of an organic promoter to the aqueous ammonia solution. By organic promoter is meant an organic solvent that helps promote the transfer of the organic hazardous waste from the soil to the aqueous ammonia solution. It is believed the organic promoter facilitates extraction of organic hazardous waste from soil by promoting the formation of micelles. Hexane is the most preferred organic promoter. Preferred promoters also include pentane, hexane, heptane, octane, mineral oil, fuel oil and combinations thereof. However, any hydrocarbon or chlorinated hydrocarbon is suitable for use s a promoter. Usually, trace amounts of the promoter are sufficient to promote removal of the toxic waste from the soil. The exact promoter used and its concentration depend on both the operating temperature and configuration of the decontaminating apparatus, as well as the organic extracting solvent used, vide infra. The exact promoter, and its proper concentration will be known to those skilled in the art.

Continuing to refer to FIG. 1, the contaminated soil housed within the hopper is transferred, preferably with an auger or similar transport device, to an agitator where it is mixed with the aqueous ammonia solution to form a slurry. Through mixing in the agitator, the contaminated soil and aqueous ammonia solution are well contacted. The preferred time of contact or incubation time in the agitator is from about 1 to about 10 minutes.

The resulting slurry is transferred to a settling tank, or series of settling tanks, to separate the aqueous ammonia solution containing organic hazardous waste from the soil. Here, most of the soil particles will settle to the bottom of the tank. The aqueous ammonia solution, which now contains the organic hazardous waste that was present in the soil, will remain in the upper portion of the tank above the settled soil. This solution can be easily removed by for example simple decantation and further processed.

For smaller decontaminating setups, the agitator and settling tank(s) can be replaced with a modified cement mixer or the equivalent. This modified mixer can provide the necessary agitation required for the desired period of contact, after which the aqueous ammonia solution containing the organic hazardous waste is removed.

The soil removed from the settling tank(s) is then tested by any of the accepted testing procedures known to those skilled in the art. Soil which has been sufficiently decontaminated according to the soil test is then returned to the site. Soil, incompletely decontaminated, is recycled to the hopper, further subjecting the soil to one or more contacting and separating steps. These recycling steps can be repeated until the desired level of decontamination has been accomplished.

In a preferred embodiment of the invention, the aqueous ammonia solution containing the organic hazardous waste which is removed from the settling tank(s) is sent to a centrifuge. Centrifuging removes any suspended or fine soil particles that may not have been separated from the aqueous ammonia solution in the settling tank(s).

Chemically, the method of this invention is best viewed as two independent extraction steps. The first is removing the organic hazardous waste from the contaminated soil, employing an aqueous ammonia solution, as described above. The second consists of isolating the organic hazardous waste from the aqueous ammonia solution. The second step is important, and is a preferred embodiment of the present invention, since the organic hazardous waste is best isolated and reduced to a small volume prior to disposal. Isolation is usually necessary because a small amount of hazardous material contained within a large volume of liquid usually cannot be disposed of economically. However, if an incinerator is located at the soil decontamination site, the second step may not be necessary.

In isolating the organic hazardous waste from the aqueous ammonia solution, it is preferred that alternative process steps and equipment be employed depending on the concentration of ammonia in the aqueous ammonia solution. High concentrations of ammonia (e.g., more than 5%) increase the efficiency of removal of organic hazardous waste from the soil, and conversely, low concentrations of ammonia (e.g., below 5%) decrease the efficiency of removal of organic hazardous waste from soil. However, isolation of organic hazardous waste from the aqueous ammonia solution is more easily achieved with low ammonia concentrations than with high concentrations of ammonia.

As previously described, ammonia concentrations between 0.1% and 10% are preferred in most situations. However, higher ior lower concentrations of ammonia may be necessary depending on the nature of the material being processed.

At low concentrations of ammonia, the isolation procedure shown in FIG. 1 is used. The aqueous ammonia solution containing the organic hazardous waste leaves the settling tank(s), and thereafter is transported to a liquid-liquid extractor. If, as previously described, the aqueous ammonia solution contains substantial quantities of fine suspended soil, the solution is optionally centrifuged prior to being transported to the liquid-liquid extractor. The aqueous ammonia solution containing the organic hazardous waste is introduced into a bed of organic extracting solvent where the organic hazardous waste is transferred to the organic extracting solvent. The organic hazardous waste partitions itself beteen the two solutions, but predominantly in the organic extracting solvent.

The organic extracting solvent which now contains the organic hazardous waste is removed and, in a preferred embodiment, is transported to a distillation apparatus. The organic extracting solvent containing organic hazardous waste is then distilled and the organic hazardous waste is isolated and disposed of.

In another preferred embodiment, the organic extracting solvent is collected and recycled for use in the liquid-liquid extractor.

Optionally, the aqueous ammonia solution is removed and recycled to the aqueous ammonia solution holding tank for use in decontamination of additional soil.

Preferred organic extracting solvents in this isolation method are selected from the group consisting of pentane, hexane, heptane, octane, Freon 113, 1,1,1-trichloroethane, and mixtures thereof.

The ammonia optionally may be first removed from the aqueous ammonia solution containing the organic hazardous waste. The removal of ammonia is accomplished by volatilizing ammonia from the aqueous ammonia solution.

The volatilizing step may consist, for example, of heating the aqueous ammonia solution to an effective temperature, and for an effective duration, sufficient to remove the ammonia from the aqueous ammonia solution containing the organic hazardous waste.

Figure 2:
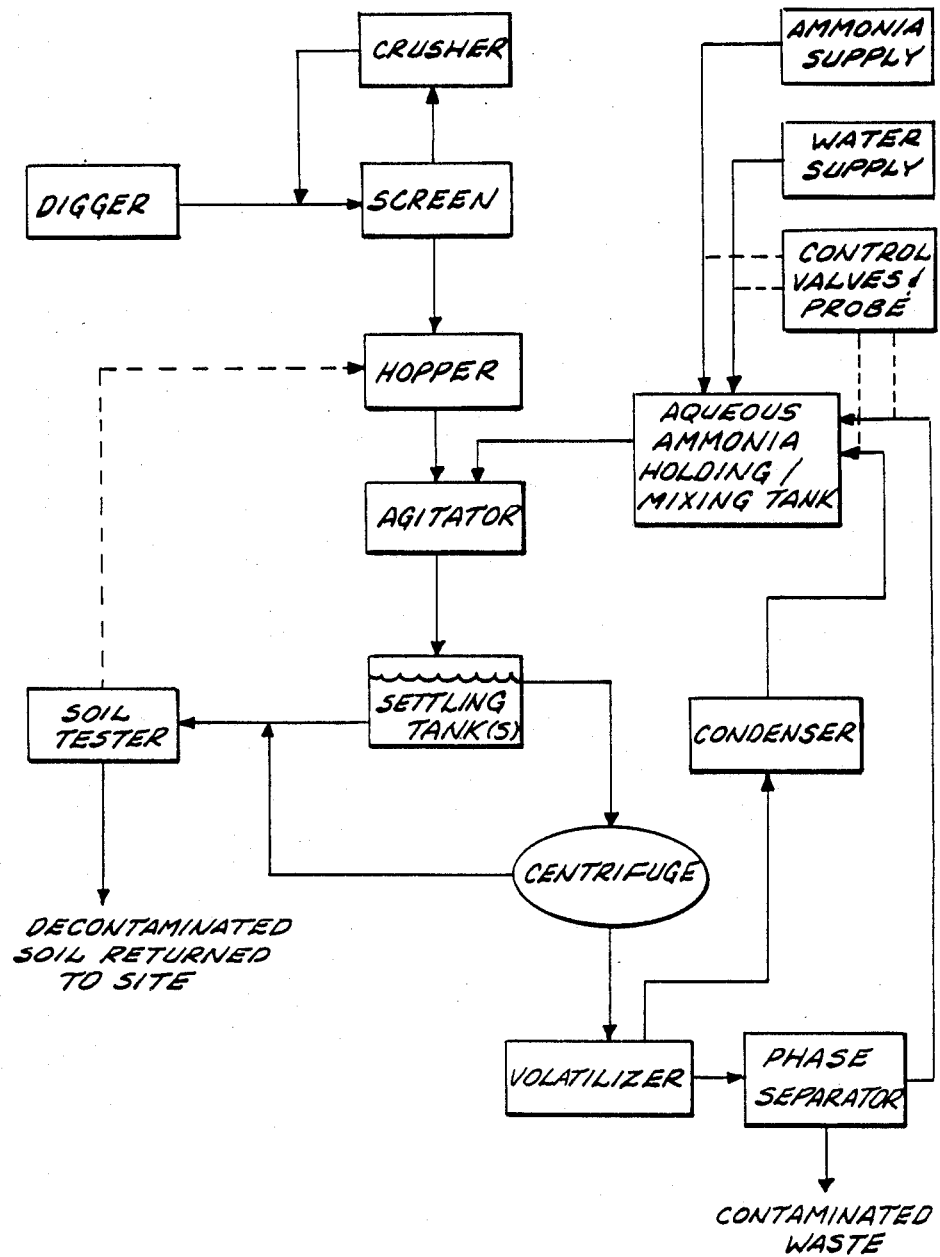
FIG. 2 is a block diagram representing the soil decontamination method employing a volatilizer, condenser, and phase separator.

In one embodiment of the invention, the volatilized ammonia is collected in a condenser and recycled as a liquid stream to the aqueous ammonia holding tank as shown in FIG. 2.

In this embodiment, smaller amounts of ammonia feedstock are required since a substantial quantity of the ammonia can be recovered and reused. Collecting, and reusing the ammonia may also be necessary to meet local air-quality standards governing the emission of ammonia gas.

The exit stream from the volatilizer then contains an organic phase consisting essentially or organic hazardous waste, an aqueous phase consisting primarily of water which may contain small amounts of organic hazardous waste, and trace amounts of promoter.

The present invention offers two alternative methods of isolating the organic hazardous waste after the volatilizing step. In one alternative embodiment, a more economical but somewhat less effective isolation method consists of sending the aqueous phase and the organic phase to a phase separator. In this embodiment, the organic hazardous waste is isolated by simply removing the organic phase. This isolation method is demonstrated by reference to FIG. 2.

Figure 3:
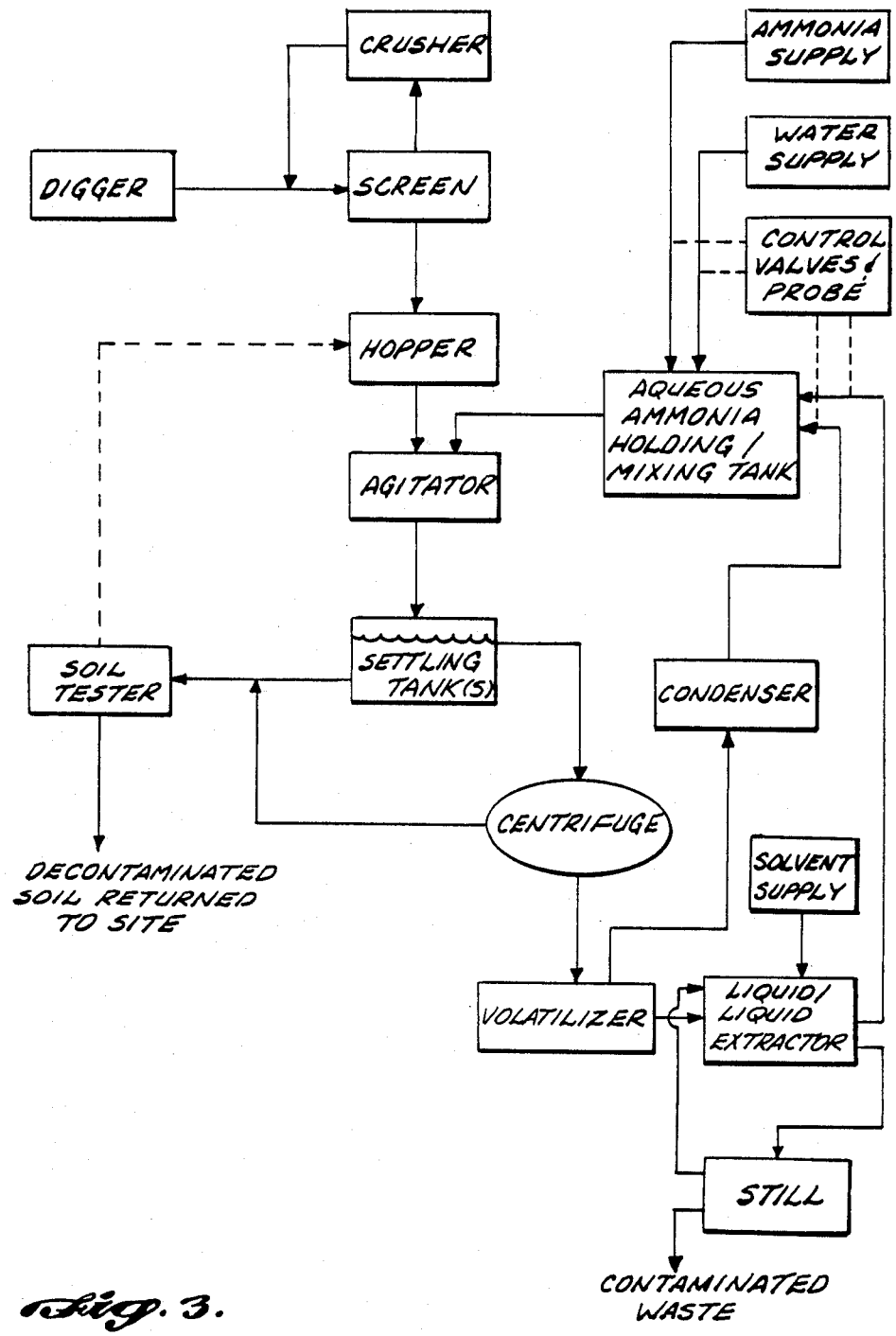
FIG. 3 is a block diagram representing the soil decontamination method employing a liquid/liquid extractor, still, volatilizer, condenser, and phase separator.

The second alternative embodiment of the present invention for isolating the organic hazardous waste after the volatilizing step is represented in FIG. 3. It consists of extracting the organic phase and the aqueous phase with an organic extracting solvent in a liquid-liquid extractor. In the liquid-liquid extractor, the stream leaving the volatilizer is dispersed in a bed of organic extracting solvent. As a result, the organic hazardous waste is partitioned primarily in the organic extraction solvent. The organic phase can be removed and sent to a distillation apparatus or disposed of in an incinerator. If incineration is the method chosen for disposal of the organic hazardous waste, then the preferred organic extraction solvents include: diesel fuel, petroleum ether, gasoline, mineral oil, fuel oil or mixtures thereof. It is preferred that in this case the organic extracting solvent be the cheapest fuel available. If on the other hand a distillation apparatus is employed, the organic hazardous waste is isolated by simple distillation of the organic extracting solvent and thereafter properly disposed of. In a preferred embodiment, the organic extracting solvent used in the extraction, together with trace amounts of promoter, is recycled for reuse in the extractor. In some instances, the promoter and the organic extraction solvent used in the liquid-liquid extractor may be the same substance. The aqueous phase which is substantially free of organic hazardous waste can, in one embodiment of the invention, be removed and recycled to the aqueous ammonia solution holding tank, where it can be reused to form an aqueous ammonia solution.

The amounts of aqueous ammonia solution, promoter, organic extracting solvent, and the types of machinery and processing equipment have not been specified. This is because one of ordinary skill, upon reading this disclosure, will be capable of selecting the proper amounts of solutions and processing equipment to effect removal of toxic waste from soil to any desired level, depending on soil characteristics at the site of contamination.

EXAMPLES

The following examples are included to assist one of ordinary skill in making and using the invention. They are intended as representative examples of the present invention and are not intended in any way to limit the scope of this disclosure or the scope of protection granted by Letters Patent hereon.

Example 1

Five grams of a soil sample (sandy with a high organic content) contaminated with mixed PCB's were placed in a glass vial. Ten milliliters of a 3.7% aqueous ammonia solution was added and then overlaid with 5 milliliters of hexane. The mixture was briefly stirred and the hexane was removed. More hexane was added and the process was repeated. Analysis of the hexane extracts showed a decreasing PCB content as the number of extractions continued. Final analysis of the soil showed a decreased PCB concentration. Three extractions were required to lower the PCB concentration from an initial level of approximately 1,000 ppm to a final concentration of less than 50 ppm by weight.

The following organic hazardous wastes are analogously removed from soil by treatment with 3.7% aqueous ammonia solution:
PCB-1242
PCB-1254
PCB-1221
PCB-1232
PCB-1248
PCB-1260
PCB-1016
chlorobenzene
1,2,4-trichlorobenzene
hexachlorobenzene
1,2-dichlorobenzene
1,3-dichlorobenzene
1,4-dichlorobenzene
2-chloronaphthalene

Example 2

Five grams of a soil sample (sandy with a high organic content) contaminated with mixed PCB's were placed in a glass vial. Ten milliliters of a 0.1% aqueous ammonia solution was added and then overlaid with 5 milliliters of hexane. The mixture was briefly stirred and the hexane was removed. More hexane was added and the process was repeated. Analysis of the hexane extracts showed a decreasing PCB content as the number of extractions continued. Final analysis of the soil showed a decreased PCB concentration. Multiple extractions were required to lower the PCB concentration from an initial level of approximately 1,000 ppm to a final concentration of less than 50 ppm by weight.

The following organic hazardous wastes are analogously removed from soil by treatment with 0.1% aqueous ammonia solution:
benzene
naphthalene
toluene
2,6-dinitrotoluene
ethyl benzene
fluoranthene
isophorone
benzo[a]pyrene
phenanthrene

Example 3

Five grams of a soil sample (sandy with a high organic content) contaminated with diesel fuel was placed in a glass vial, and ten milliliters of a 10% aqueous ammonia solution was added. The aqueous ammonia solution was thereafter separated from the soil and the ammonia is volatilized. The remaining liquids were then extracted with hexane. Analysis of the hexane solution showed the diesel fuel was extracted by this process.

The following organic hazardous wastes are analogously removed from soil by treatment with 10% aqueous ammonia solution:
aldrin
dieldrin
chlordane
DDT and metabolites
4,4'-DDT
4,4'-DDE
4,4'-DDD
endosulfans
alpha-endosulfan
beta-endosulfan
endosulfan sulfate
endrin
endrin aldehyde
heptachlor
heptachlor epoxide
hexachloroethane
bis(chloromethyl)ether
bis(2-chloroethyl)ether
2-chloroethyl vinyl ether
2,3,7,8-tetrachlorodibenzo-p-dioxin
3,3-dichlorobenzidine
toxaphene
benzo[a]anthracene
benzo[a]pyrene
benzo[b]fluoranthene
benzo[k]fluoranthene
chrysene
acenaphthylene
anthracene
benzo[ghi]perylene
fluorene
phenanthrene
dibenzo[a,h]anthracene
indeno[1,2,3-cd]pyrene
pyrene
bis(2-ethylhexyl)phthalate
butyl benzyl phthalate
di-n-butyl phthalate
di-n-octyl phthalate
diethyl phthalate
dimethyl phthalate The present invention has been described in relation to a preferred embodiment thereof and several alternatives thereto. One of ordinary skill, after reading the foregoing specification, will be able to effect various changes, substitutions of equivalents, and other alterations without departing from the broad concepts disclosed herein. It is therefore intended that the scope of Letters Patent granted hereon be limited only by the definition contained in the appended claims and equivalents thereof.

The embodiments of the invention in which an exclusive property privilege is claimed are defined as follows:

1. A method for decontaminating soil comprising the steps:
   (a) providing an aqueous ammonia solution effective for removing an organic hazardous waste from contaminated soil;
   (b) contacting a soil contaminated with the organic hazardous waste with the aqueous ammonia solution for a period of time effective to transfer the organic hazardous waste from the soil to the aqueous ammonia solution; and,
   (c) separating the aqueous ammonia solution containing the organic hazardous waste from the soil.

2. The method of claim 1, wherein the organic hazardous waste is nonpolar.

3. The method of claim 2, wherein the organic hazardous waste is selected from the group consisting of polynuclear aromatic hydrocarbons, phthalate esters, mononuclear aryls, dinuclear aryls, substituted mononuclear aryls, polychlorinated biphenyls, chlorinated benzenes, chlorinated naphthalenes, chlorinated phenols, halogenated phenyl ethers, alkyl chlorinated hydrocarbons, and petroleum products.

4. The method of claim 3, wherein the organic hazardous waste is selected from the group consisting of polynuclear aromatic hydrocarbons, phthalate esters, polychlorinated biphenyls, chlorinated benzenes, naphthalene, oil, grease, and diesel fuel.

5. The method of claim 1, wherein the aqueous ammonia solution comprises from about 0.1% to about 10% ammonia by weight.

6. The method of claim 5, wherein the aqueous ammonia solution further comprises an organic promoter of effective concentration to enhance removal of the organic hazardous waste from the soil.

7. The method of claim 6, wherein the organic promoter is selected from the group consisting of an unsubstituted hydrocarbons and chlorinated hydrocarbons.

8. The method of claim 7, wherein the organic promoter is selected from the group consisting of pentane, hexane, heptane, octane, mineral oil, fuel oil, Freon 113, 1,1,1-trichloroethane, and mixtures thereof.

9. The method of claim 8, wherein the organic promoter is hexane.

10. The method of claim 1, wherein the contacting step comprises forming a slurry of the soil and the aqueous ammonia solution.

11. The method of claim 10, wherein the slurry comprises soil having a particle size of less than about 3 inches in diameter.

12. The method of claim 11, wherein the slurry is agitated, thereby more thoroughly transferring organic hazardous waste from the soil to the aqueous ammonia solution.

13. The method of claim 1, wherein the period of time comprises from about 1 to about 10 minutes.

14. The method of claim 1, wherein the separating step comprises settling the soil from the aqueous ammonia solution and removing the aqueous ammonia solution.

15. The method of claim 14, wherein the separating step further comprises centrifuging the aqueous ammonia solution, thereby removing suspended soil particles from the aqueous ammonia solution.

16. The method of claim 14, further comprising, after the separating step, isolating the organic hazardous waste from the aqueous ammonia solution.

17. The method of claim 16, wherein the isolating step comprises extracting the aqueous ammonia solution containing the organic hazardous waste with an organic extracting solvent, thereby transferring the organic hazardous waste to the organic extracting solvent.

18. The method of claim 17, further comprising distilling the organic extracting solvent containing the organic hazardous waste, thereby removing the organic hazardous waste from the organic extracting solvent.

19. The method of claim 17, wherein the organic extracting solvent is selected from the group consisting of pentane, hexane, heptane, octane, Freon 113, 1,1,1-trichloroethane, and mixtures thereof.

20. The method of claim 19, wherein the organic extracting solvent is hexane.

21. The method of claim 16, wherein the isolating step comprises: (a) volatilizing ammonia from the aqueous ammonia solution, thereby forming an organic phase consisting essentially of organic hazardous waste and an aqueous phase; and, (b) removing the organic phase.

22. The method of claim 21, wherein the volatilizing step comprises heating the aqueous ammonia solution to a temperature, and for a period of time, effective to remove substantially all of the ammonia in the aqueous ammonia solution.

23. The method of claim 22, wherein the removing step comprises simple phase separation.

24. The method of claim 16, wherein the isolating step comprises: (a) volatilizing ammonia from the aqueous ammonia solution, thereby forming an organic phase consisting essentially of organic hazardous waste and an aqueous phase; and (b) extracting the organic phase and the aqueous phase with an organic extracting solvent, thereby transferring the organic hazardous waste to the organic extracting solvent.

25. The method of claim 23, further comprising distilling the organic extracting solvent containing organic hazardous waste, thereby removing the organic hazardous waste from the organic extracting solvent.

26. The method of claim 24, wherein the organic extracting solvent is selected from the group consisting of diesel fuel, petroleum ether, gasoline, mineral oil, fuel oil, and mixtures thereof.

27. The method of claim 1, further comprising, in sequential order, a plurality of contacting and separating steps.

* * * * *

UNITED STATES PATENT AND TRADEMARK OFFICE
CERTIFICATE OF CORRECTION

PATENT NO. : 4,841,998

DATED : June 27, 1989

INVENTOR(S) : James E. Bruya

It is certified that error appears in the above-identified patent and that said Letters Patent is hereby corrected as shown below:

Column 1, line 26: "chemicall" should be --chemical--

Column 1, line 41: "Paterson" should be --Peterson--

Column 1, line 66: "U.D." should be --U.S.--

Column 2, line 23: "compositions" should be --composition--

Column 2, lines 28-29: "hazardous-wastes" should be --hazardous wastes--

Column 2, line 30: "volume f" should be -- volume of--

Column 2, line 43: "thiugh" should be --though--

Column 3, line 9: "naphthalenes" should be --napthalenes--

Column 4, line 37: "concrejte" should be --concrete--

Column 4, line 45: "fior" should be --for--

Column 5, lines 28-29: "2,4j-dichlorophenol" should be 2, 4-dichlorophenol--

Column 6, line 5: "holdin" should be --holding--

Column 6, line 30: "use s" should be --use as--

Column 7, line 41: "jor" should be --or--

Column 8, line 1: "the.aqueous" should be --the aqueous--

UNITED STATES PATENT AND TRADEMARK OFFICE
CERTIFICATE OF CORRECTION

PATENT NO. : 4,841,998

DATED : June 27, 1989

INVENTOR(S) : James E. Bruya

It is certified that error appears in the above-identified patent and that said Letters Patent is hereby corrected as shown below:

Column 8, line 29: "or" should be --of--.

Signed and Sealed this

Twenty-sixth Day of June, 1990

Attest:

HARRY F. MANBECK, JR.

*Attesting Officer*     *Commissioner of Patents and Trademarks*